(12) United States Patent
Pirzanski

(10) Patent No.: US 10,158,954 B1
(45) Date of Patent: Dec. 18, 2018

(54) TEMPLATE BASED CUSTOM EAR INSERT VIRTUAL SHAPING METHOD

(71) Applicant: Chester Zbigniew Pirzanski, Brampton (CA)

(72) Inventor: Chester Zbigniew Pirzanski, Brampton (CA)

(*) Notice: Subject to any disclaimer, the term of this patent is extended or adjusted under 35 U.S.C. 154(b) by 0 days.

(21) Appl. No.: 15/978,118

(22) Filed: May 12, 2018

Related U.S. Application Data

(60) Provisional application No. 62/599,724, filed on Dec. 17, 2017.

(51) Int. Cl.
*H04R 25/00* (2006.01)
*B33Y 80/00* (2015.01)

(52) U.S. Cl.
CPC ......... *H04R 25/652* (2013.01); *H04R 25/552* (2013.01); *H04R 25/658* (2013.01); *B33Y 80/00* (2014.12); *H04R 2225/77* (2013.01)

(58) Field of Classification Search
CPC .................. H04R 25/658; H04R 2225/77
See application file for complete search history.

(56) References Cited

U.S. PATENT DOCUMENTS

| | | | |
|---|---|---|---|
| 7,084,870 B2 | 8/2006 | Fang | |
| 7,286,679 B2 | 10/2007 | Fang | |
| 7,308,328 B2 * | 12/2007 | Fang | H04R 25/652 |
| | | | 264/222 |
| 7,447,556 B2 | 11/2008 | McBagonluri | |
| 7,605,812 B2 * | 10/2009 | McBagonluri | G06F 17/5009 |
| | | | 345/420 |
| 7,609,259 B2 * | 10/2009 | McBagonluri | H04R 25/658 |
| | | | 345/419 |
| 7,672,823 B2 | 3/2010 | Nikles | |
| 7,801,708 B2 * | 9/2010 | Unal | G06K 9/00214 |
| | | | 345/419 |
| 7,991,594 B2 * | 8/2011 | Unal | G06K 9/00214 |
| | | | 345/419 |

(Continued)

FOREIGN PATENT DOCUMENTS

| CA | 2408449 C | 2/2009 |
|---|---|---|
| WO | 117407 A2 | 11/2006 |

OTHER PUBLICATIONS

Cortez, R. Changing with the times: Applying digital technology to hearing aid shell manufacturing. Hearing Review 2004:11(3):30-38.

(Continued)

*Primary Examiner* — Joshua T Kennedy

(57) ABSTRACT

This invention describes virtual shaping the canal area of an ear impression for custom ear inserts with a set of predetermined adjustable templates. There are two types of templates: AP and SI. AP templates are used to model the canal area in the anterior-posterior plane. SI templates are used to model the canal in the superior-inferior plane. The modeling software selects a set of AP and SI templates with curvatures most suitable for a given ear and fits them in the canal area of the ear impression. These templates form a frame that is surfaced and becomes a virtual 3D model of the custom insert. Anatomically accurate curvatures of templates ensure a superior fit of the resulting ear insert and eliminate common inaccuracies that occur in computer-aided impression shaping.

4 Claims, 18 Drawing Sheets

(56) References Cited

U.S. PATENT DOCUMENTS

| | | |
|---|---|---|
| 8,032,337 B2 | 10/2011 | Deichmann |
| 8,064,731 B2 * | 11/2011 | Zouhar .............. G06K 9/00214 345/419 |
| 8,285,408 B2 | 10/2012 | Schiller |
| 9,113,266 B2 | 8/2015 | Lott |
| 2009/0296980 A1 | 12/2009 | Yi |
| 2012/0068379 A1 * | 3/2012 | Klemenz .............. H04R 25/652 264/313 |
| 2015/0073262 A1 * | 3/2015 | Roth .................... A61B 5/1077 600/411 |
| 2016/0057552 A1 | 2/2016 | Kure |

OTHER PUBLICATIONS

Darkes, P. Shaping the future of shell technology with digital mechanics. Hearing Review 2002:9(4):56-57,76.

\* cited by examiner

TEMPLATE BASED CUSTOM EAR INSERT VIRTUAL SHAPING METHOD

RELATED US APPLICATION DATA

This application claims the benefit of provisional patent application No. 62/599,724, entitled Template based custom ear insert shaping method, filed on Dec. 17, 2017 by the inventor.

BACKGROUND OF THE INVENTION

This invention relates to a process for the production of custom-moulded ear inserts that are required for ear-level hearing aids and earmolds.

The shape of a custom ear insert is derived from an ear impression taken individually from the subject's ear. The ear impression is a negative replica of the ear.

There are currently two methods of impression shaping into custom ear inserts.

The older method is manual impression shaping. In this process, the impression is shaped manually by a technician with the use of mechanical cutters and grinders. The technician removes outer layers from the impression to achieve an insert shape suitable for a given custom product.

The newer method is computer-aided shaping of a digital ear image that is obtained by scanning of silicone impression, direct near scanning, CT scanning, MR1 scanning, or any volumetric imaging technique, and is further called a digital impression. In this process, the impression is virtually shaped with cutting and grinding tools available in the software.

Both the manual shaping and computer-aided modeling methods are time consuming, subjective, intuitive, and not free from inaccuracies. Inaccuracies in impression shaping result in ear inserts that have inadequate fit and are subsequently returned to the manufacturer with either a request for a new earpiece, or a request for a refund.

The template shaping method presented here offers an innovative approach to impression modeling. Unlike other methods, the shaping of the insert is done with a set of templates that have predetermined but adjustable curvatures. Anatomically accurate templates ensure superior fit of the resulting ear insert and eliminate common inaccuracies occurring in computer-aided modeling.

BRIEF SUMMARY OF THE INVENTION

The foregoing advantages and features are presented to assist in understanding the invention.

They are not intended to be considered limitations on the invention, and should therefore not be considered dispositive in determining equivalents.

The purpose of the invention is to automate the process of virtual modeling the canal portion of custom ear inserts, shorten modeling time, eliminate subjective and intuitive decisions made by the software operator, and improve the quality of the custom product.

The essential difference between computer-aided modeling and this template method is as follows:
a. Computer-aided modeling derives the shape of an ear insert by removing outer layers from the impression.
b. The template method derives the shape of an ear insert by acquiring from the inside of the impression only as much volume as is required for the insert.

This template method is suitable for shaping the canal area for all custom products including, but not limited to Full-Shell, Half-Shell, Canal, Completely-In-Canal and Invisible-In-Canal, and all styles of earmolds. To be suitable for this method, the canal area of impression must have adequate length and be free from abnormalities, voids, and surgical alterations.

FIG. 1 defines human ear anatomical features imprinted in impression 10.
a. The canal area 100 is a long protrusion on the impression that extends from the canal aperture 120 towards the eardrum 140. The canal area is commonly 10 mm to 25 mm long and in most cases does not include the imprint of the eardrum. Cross sections of the canal are of oval shape.
b. The canal aperture 120 is the entrance to the ear canal and is approximately 3 mm to 10 mm long.
c. The ear canal 100 has two bends. The first canal bend 110 is located past the canal aperture 120 and changes the direction of the ear canal from somewhat anterior to somewhat posterior. The first bend commonly features a bulge 170. The second canal bend 130 is located close to the eardrum 140 and changes the direction of the ear canal from somewhat posterior to somewhat anterior.
d. Anatomically, the ear canal from the canal aperture to the second bend is comprised of cartilage, which is soft and forgiving. Beyond the second bend the cartilage thins as it transitions into the ear bony area where the canal is rigid and sensitive.
e. Externally, the ear features the concha 150 and helix 160.

Shaping the canal portion of an impression is critical for proper fit.

FIG. 2 shows several ear inserts derived from the same impression 200. The impression anterior canal first bend 110 and second bend 130 are marked. Insert 301 is modeled properly with full attention given to the ear anatomy. With inserts 302, 303, 304 and 305, there is a risk that they may not fit well in the ear due to various possible issues; difficulty of insertion 302, lack of secure fit 303, discomfort 304, or incorrect sound direction 305. Though all inserts, except 305, have the same canal length, they differ in the detail of canal shaping. As a result of this, they differ in the quality of the insert fit in the user's ear.

This template method employs two types of templates for impression shaping: AP and SI. AP templates are used to model the canal area in the anterior-posterior (AP) plane. SI templates are used to model the canal in the superior-inferior (SI) plane. Examples of AP templates 401, 402, 403 and SI templates 405, 406 are provided in FIG. 3.

FIG. 4 provides images of three impression contour lines 201, 202, 203 fitted with a selection of AP templates: 401, 402, 403.

The same AP template can be used to model a variety of impressions. FIG. 5 shows AP-1 template 401 fitted inside the contour line of four different impressions 204, 205, 206, 207.

FIG. 6 shows four more impression contour lines 501, 502, 503, 504 fitted with the same SI-1 template 405.

FIG. 7 illustrates the virtual modeling process that begins with shaping the canal in the anterior-posterior plane with an AP template. AP template 401 is inserted into the canal area of an ear impression 201 and its tip is extended to the depth required for a given custom product. Next, the template 401 is alternately stretched across the canal and rotated to achieve the target fit accuracy at the canal aperture. If the target fit accuracy cannot be achieved, another AP template having a different curvature is fitted in the canal in the same fashion. This process of template changing and fitting continues until an AP template with the desired target fit accuracy is found. Impression shaping in the superior-inferior plane with SI templates follows. An SI template 405 is inserted into impression 503 to the same depth as the AP template. The width and length of the SI template are adjusted for proper fit.

The selected AP and SI templates create a 3D virtual frame that extends from the canal aperture into the ear canal. The frame is surfaced to give the insert 3D shape.

Figure 1:
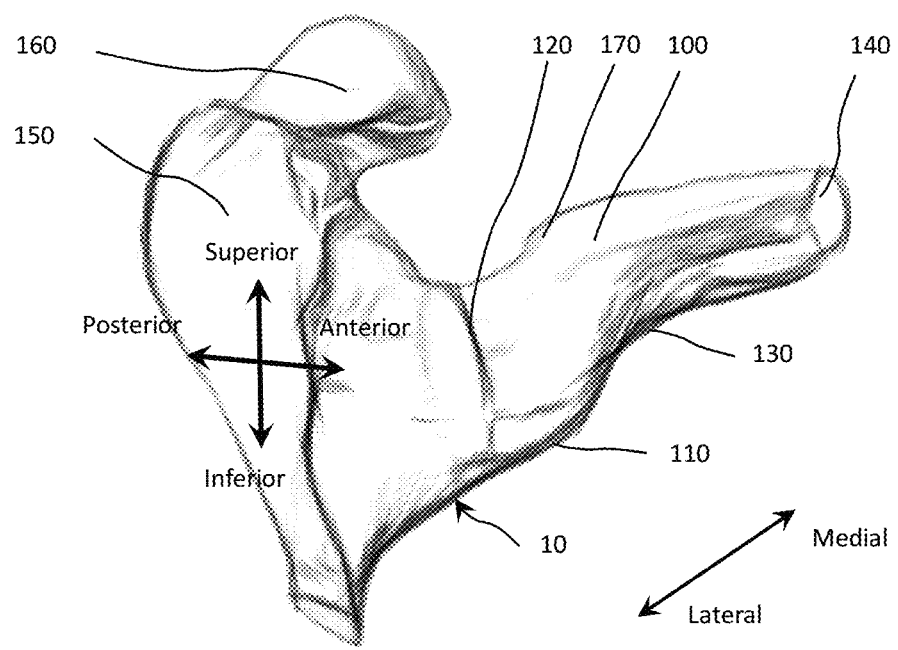
FIG. 1 illustrates details of the right human ear.
Figure 2:
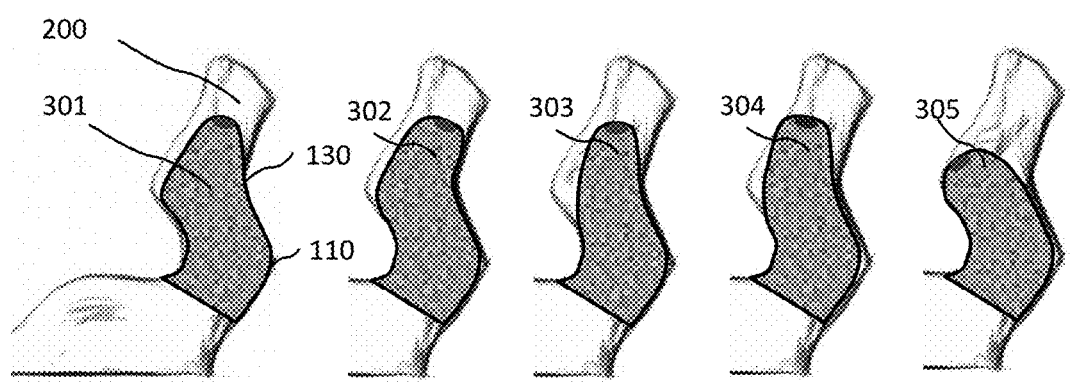
FIG. 2 shows examples of custom ear inserts that have different in-ear fitting qualities.

Figure Considerations:
  a. Ear impression 10 in FIG. 1 is shown in an anatomically correct position, that is how the impression resides in the human ear. Other figures show impressions or impression contour lines with the canal area pointing up. This is the common impression orientation as it is being modelled by a software operator, or how impression images appear in work instructions. If the impression anatomical orientation is essential for a figure, the anatomical planes are provided.
  b. Impression contour lines are proper for right ears and left ears.
  c. Impression contour lines are true to the size and shape of the ear.
  d. Insertion depth of AP and SI templates into the ear canal is approximately 13 mm.

DETAILED DESCRIPTION OF THE INVENTION

For the purpose of this invention, a template is defined as a line with a predetermined curvature. The curvature of each template is anatomically accurate and designed to optimize the fit of the insert in the ear. Template functional areas include: acoustic seal area 951, retention area 952, insertion area 953, comfort area 953, and sound direction area 954, as illustrated in FIGS. 8A and 8B.

The template functional areas perform as follows:
  a. Acoustic seal area 951 seals the ear to prevent sound leakage.
  b. Retention area 952 provides a widening on the insert that secures its fit in the ear. The retention area may not be present on AP templates designed for impressions that lack a bulge, or have a small bulge, see FIG. 3, template 403.
  c. Insertion area 953 ensures that the insert tip is slim enough to pass through the ear canal.
  d. Comfort area 953 eliminates physical contact between the ear canal bony section and the insert tip.
  e. Sound direction area 954 ensures that the sound bore on the insert is not obstructed by a canal wall.

Figure 8A:
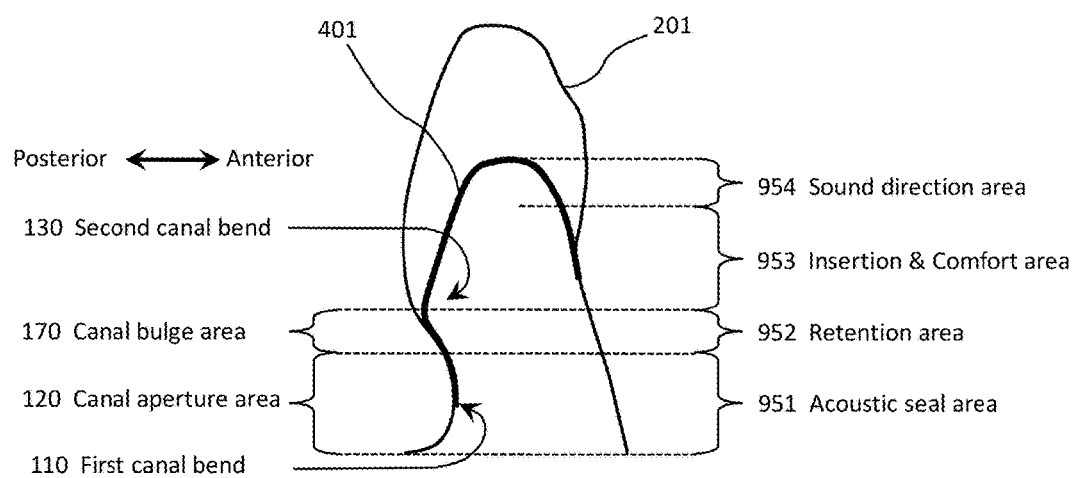
FIG. 8A and FIG. 8B illustrate impression anatomical areas and template functional areas.

FIG. 8A shows AP template 401 and impression 201 in the anterior-posterior view. The ear anatomical areas and the template functional areas are marked, and illustrate how the areas correspond with each other:
  a. The canal aperture area 120 on impression is the template acoustic seal area 951. The first canal bend 110 entirely belongs to the acoustic seal area,
  b. The bulge lateral area 170 on impression is the template retention area 952,
  c. The area past the canal second bend 130 on impression is the template insertion and comfort area 953.

Figure 8B:
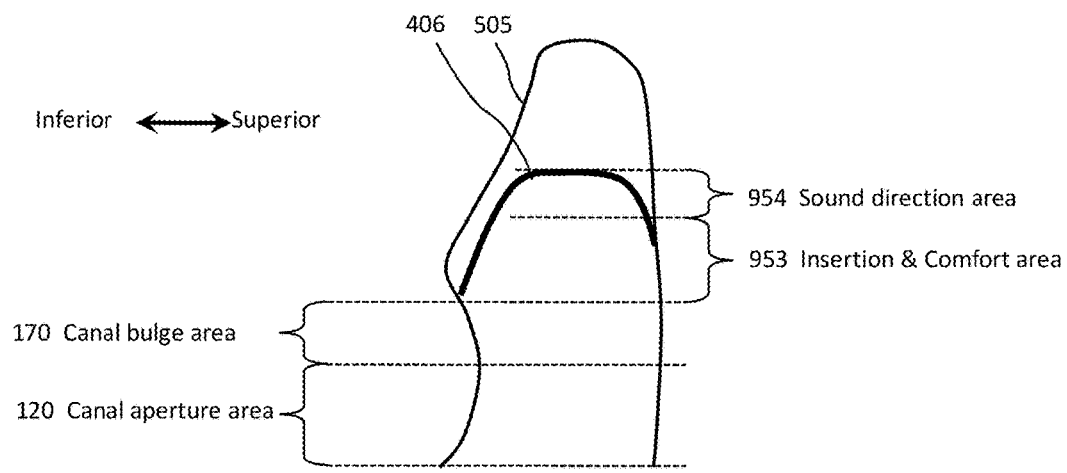

FIG. 8B shows SI template 406 and impression 505 in the superior-inferior view. The ear anatomical areas and the template functional areas are marked, and illustrate how the areas correspond with each other:
  a. SI template insertion area 953, comfort area 953, and sound direction area 954 reside within the canal bony section.
  b. SI template partially reduces the bulge area 170.
  c. If the bulge is not present on impression, or is minor, template 405 is proper.

For short canal ear inserts such as full-shell, there is no comfort area on AP or SI templates due to the fact that the insert does not extend into the ear bony area. The insertion area is short and rounds the insert tip to facilitate its introduction into the ear.

Figure 9:
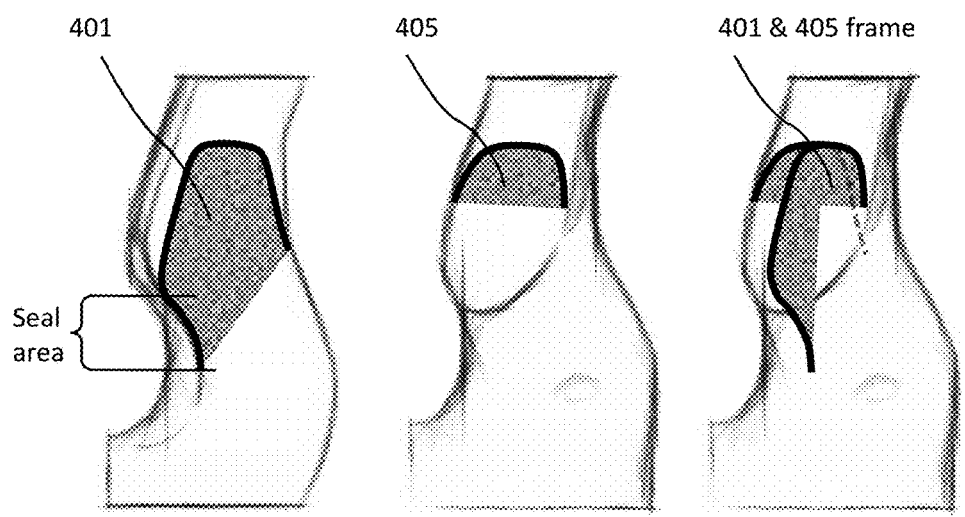
FIG. 9 shows AP and SI templates that create a virtual 3D frame inside impression.

As illustrated in FIG. 9, at the beginning of the shaping process, an AP template having the highest fit rate (for example 401) is inserted into the canal area and is extended to the depth required for a given custom product.

The template is alternately rotated and stretched across the canal to achieve the target fit accuracy at the seal and retention areas, and avoiding collisions with the rest of the impression. If the target fit accuracy cannot be achieved, the AP template is replaced with another AP template of a different shape and the second highest fit rate. The new AP template is fitted in the canal in the same fashion. This process of template changing and fitting continues until an AP template with the target fit accuracy is selected.

Canal shaping in the superior-inferior plane with SI templates follows, see FIG. 9. An SI template having the highest fit rate (for example 405) is inserted into the canal area to the same depth as the AP template. The width and length of the SI template are adjusted for a collision free fit. If a collision free fit cannot be achieved, the SI template is replaced with another SI template having a different shape and the second highest fit rate, and the new SI template is fitted in the same fashion. This process of template changing and fitting continues until an SI template is fitted satisfactorily.

The placement of the AP template in the anterior-posterior direction and placement of the SI template in the superior-inferior direction aligns the templates at a 90 degree an and creates a 3D virtual frame for custom ear insert, as illustrated in FIG. 9 with templates 401&405.

One AP template and one SI template is the minimum required to create the 3D frame. The number of AP templates and SI templates employed depends on the target fit accuracy of the 3D virtual frame in digital impression.

The 3D virtual frame features the same functional areas as AP and SI templates: the acoustic seal 951, retention 952, insertion and comfort area 953, and sound direction area 954.

Figure 10:
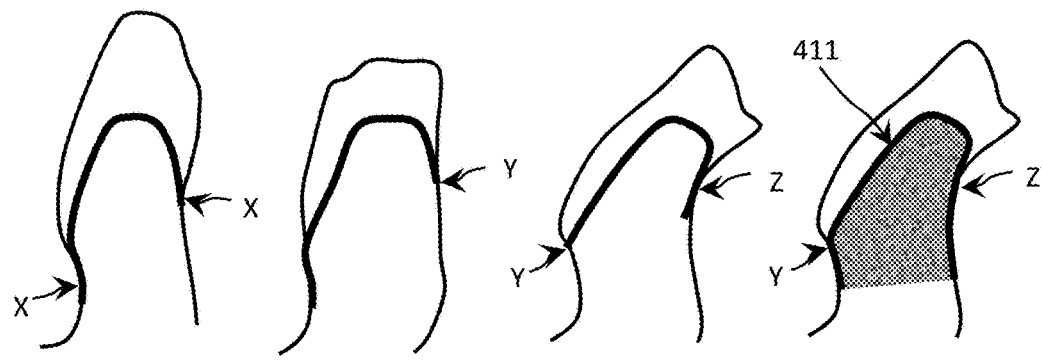
FIG. 10 illustrates template integration to the impression.

FIG. 10 illustrates the integration process of a template with the impression.
 a. The template may blend naturally with the impression (X).
 b. When the end of a template meets the impression at an angle (Y) or intersects it, a default rounding is applied to that area.
 c. When the end of the template becomes tangent to the contour of the impression (Z), the impression below the tangent point becomes the contour of the insert. Insert 411 shows the integration process at points Y and Z complete.

The insertion depth of AP and SI templates determines the canal length of the custom product. The canal length is commonly measured from the canal aperture 120 inward the canal. For example, the canal length for canal-style hearing aids is 10 mm to 13 mm.

Figure 11:
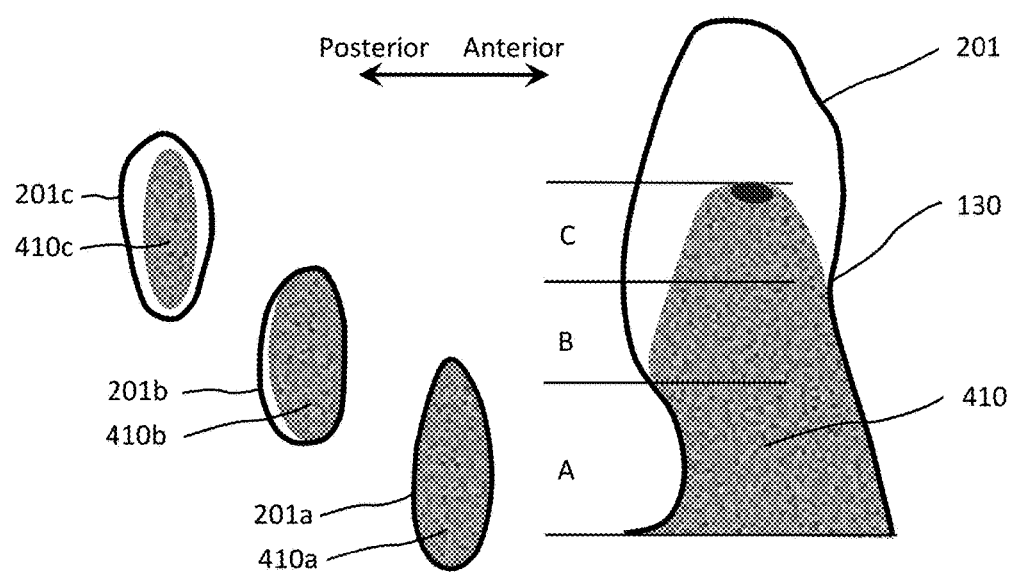
FIG. 11 illustrates three cross sections of an ear impression and ear insert.

The 3D virtual frame shown in FIG. 9 is surfaced with oval rings to create a hollow 3D virtual model of the custom insert. The variety of oval ring shapes required surfacing method is illustrated in FIG. 11—with three canal cross sections. A canal cross section is a shape exposed by making a straight cut through canal.

FIG. 11 shows impression 201, ear insert 410, and canal cross sections at sectors A, B and C.
 a. In sector A, insert cross section 410a is an irregular oval ring that closely conforms to the shape of the ear canal represented by impression 201a.
 b. In sector B, insert cross section 410b is an irregular, partially regular, or regular oval ring. Sector B of impression 201b is the transition sector where the insert cross sections gradually change from irregular oval rings to regular oval rings.
 c. In sector C, insert cross section 410c is a regular oval ring that makes no contact with impression 201c.

The height of an oval rings is 0.1 mm to 0.3 mm. Thinner oval rings are required for higher modeling resolution, thicker for lower resolution.

Oval rings are positioned on 3D frame parallel to the lateral frame opening.

Figure 12:
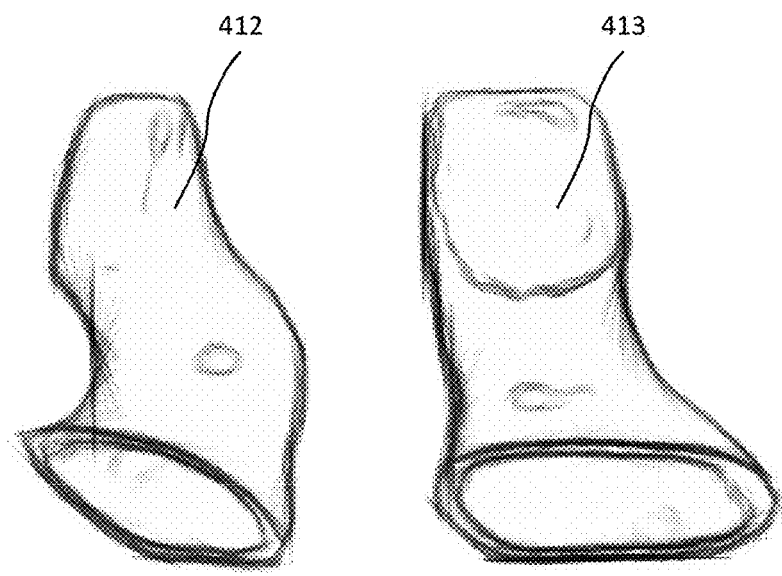
FIG. 12 shows an example of a modelled custom ear insert.

FIG. 12 provides an example of a finished ear insert in 412 and 413 view.

A template fit accuracy of 90% at the canal aperture is satisfactory for comfort and proper seal.

This is due to the fact that the canal cartilage is soft and minor differences between the template curvature and the ear curvature are accommodated by the ear tissue without any sensation of discomfort.

A fit rate study conducted on one hundred impressions found that three templates AP-1, AP-2 and AP-3 were sufficient to accurately model canal-style ear inserts from over 95% of impressions. Template AP-1 had the highest fit rate of 63%, template SI-1 a 90% fit rate.

Figure 13:
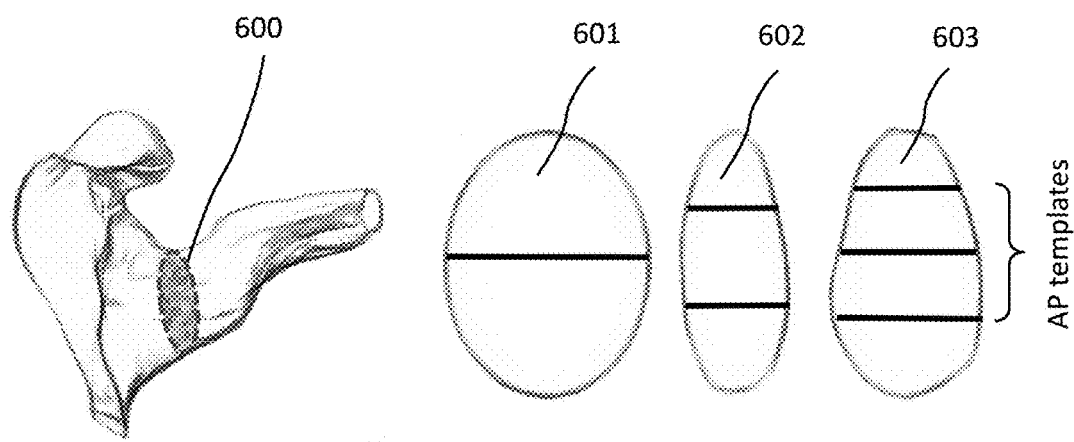
FIG. 13 shows different impression cross sections at the canal entrance.

The number of AP templates required to model an impression vary. FIG. 13 provides images of different canal cross sections 601, 602, 603 at the canal entrance 600. If this cross section of the canal is of regular oval shape 601, one AP template is satisfactory to shape the impression. If the cross section is of irregular oval shape 602 or 603, two or more AP templates are required to adequately capture the contour of this canal cross section.

Since ear inserts for different products (e.g. full-shell and canal-style shell) require different default canal lengths, each product may require a set of AP templates proper for the default. Custom products that share the same default canal length (e.g. half-shell hearing aid and half-shell earmold) utilize the same set of templates.

Figure 14:
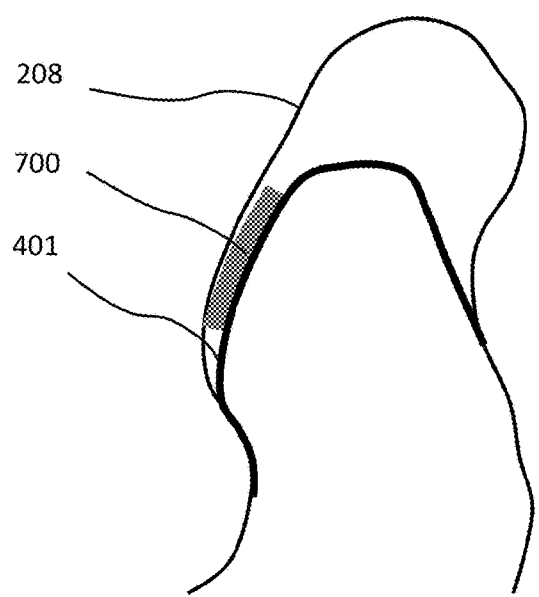
FIG. 14 shows an example of an AP template with a build-in comfort zone.

As illustrated in FIG. 14, comfort of the resulting ear insert is further enhanced by adding to the template comfort area 953 a line with a predetermined thickness 700 to keep this template section at a preset distance from the impression wall. The comfort zone can make contact with impression wall 208, but not the template 401. Each AP template and each SI template has its own comfort zone assigned.

The comfort zones are removed from templates before the 3D virtual frame is surfaced.

Figure 3:
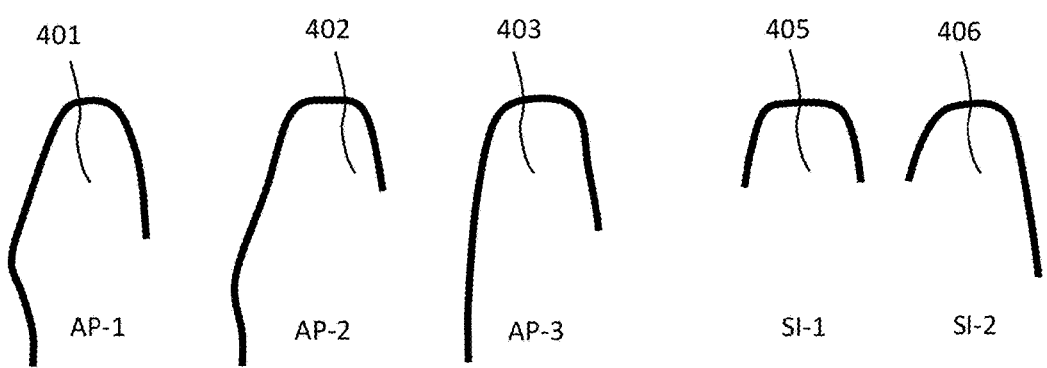
FIG. 3 shows examples of AP and SI templates having different curvatures.
Figure 4:
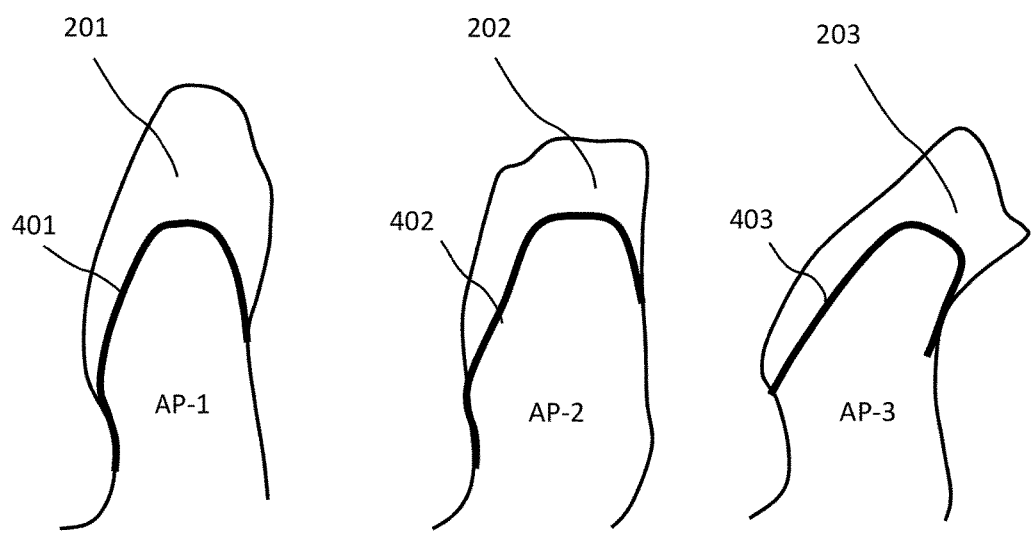
FIG. 4 shows three impressions with templates AP-1, AP-2 and AP-3.
Figure 5:
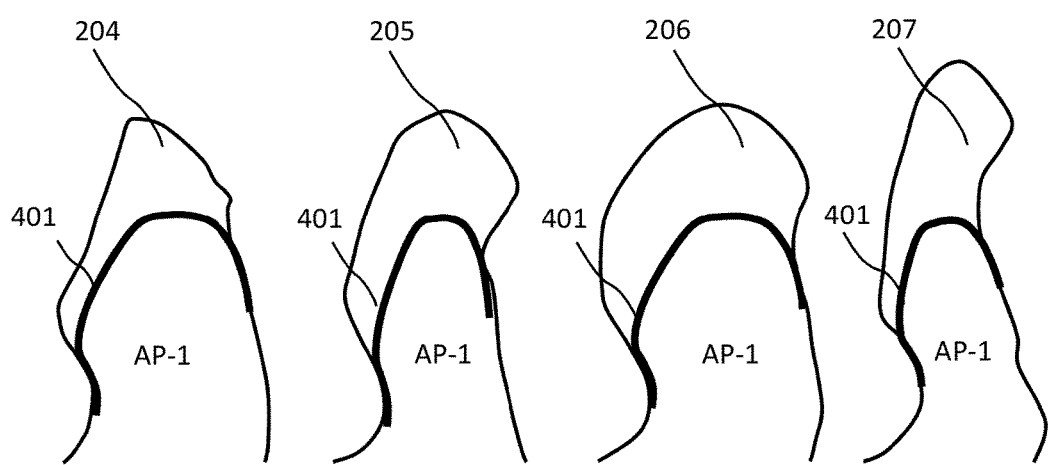
FIG. 5 shows AP-1 template fitted inside four different impressions.
Figure 6:
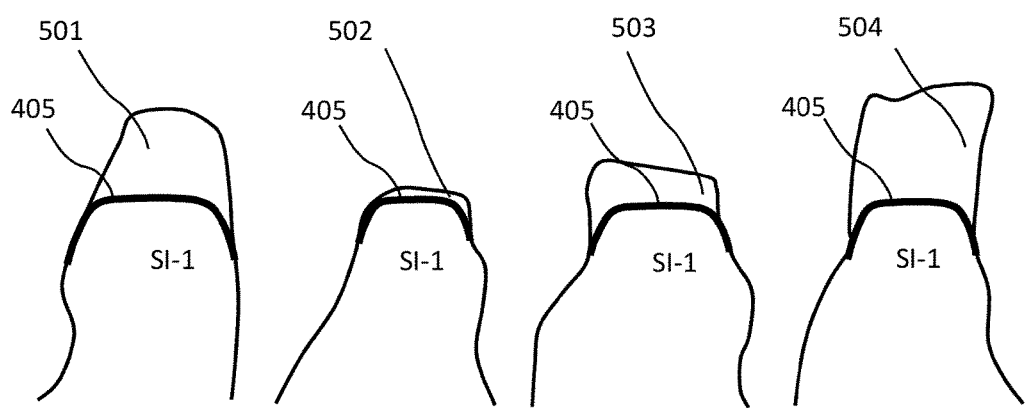
FIG. 6 shows impressions of varying shapes fitted with the same SI-1 template.
Figure 7:
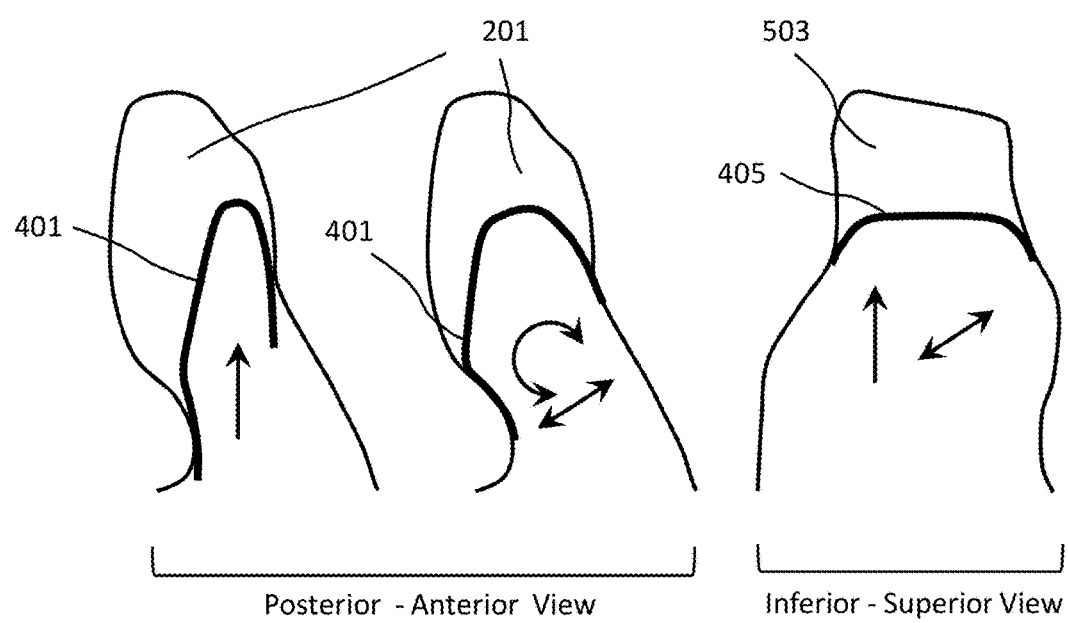
FIG. 7 shows impression shaping process with AP and SI templates.
Figure 15:
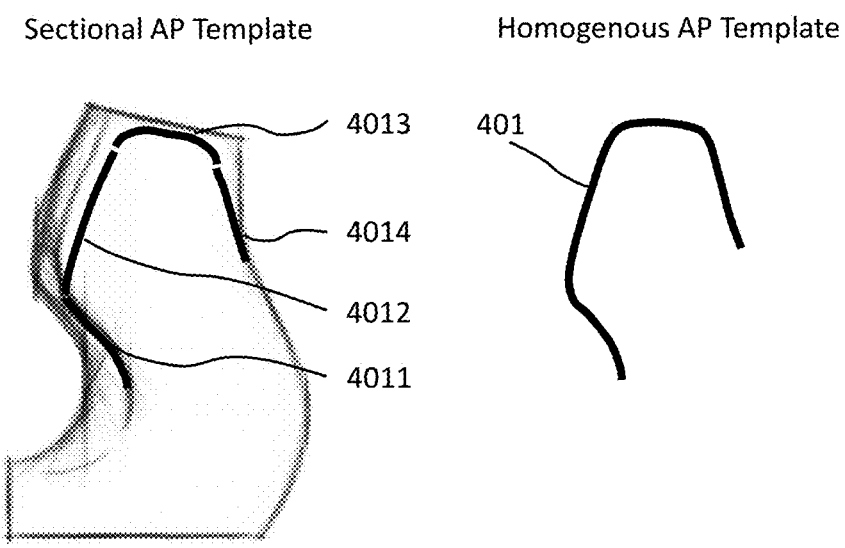
FIG. 15 illustrates a sectional AP template.

Alternatively, instead of utilizing homogenous templates as shown in FIG. 3, a template can be assembled from sections having different curvatures. An example is provided in FIG. 15: the AP template includes four sections: seal and retention section 4011, 2) posterior section 4012, 3) tip section 4013, and 4) anterior section 4014. Each section is fitted individually in the impression and then all sections are assembled as a homogenous AP template 401.

Figure 16:
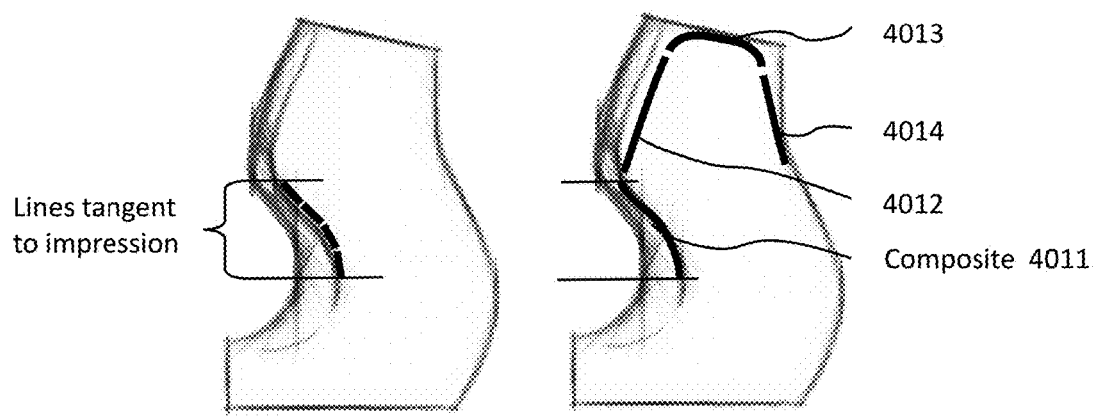
FIG. 16 shows short lines tangent to the canal curvature.

FIG. 16 illustrates a method of shaping the insert aperture with a number of short lines that are tangent to the canal curvature. The software fits each tangent line individually to the contour of the impression, and then joins the tangent lines to create the composite curve 4011. This composite curve 4011 is assembled with curves 4012, 4013, 4014 to make the final AP template.

The final set of templates for a given custom product may include a combination of homogenous templates, sectional templates, and tangent lines. The objective is to capture the geometry of the ear canal at the seal area and retention area within a certain range of accuracy and give oval contours to the rest of the insert cross sections.

When shaping binaural ear inserts, that is inserts for both ears of the same subject, this template method is applied as follows:
 a. The set of AP and SI templates that made the best fit for shaping the first impression is tried first for shaping the other impression, or
 b. When one impression is satisfactory and the other impression has a shorter canal than required, the AP and SI templates used for shaping the satisfactory impression are used to model the inferior impression.

Figure 17:
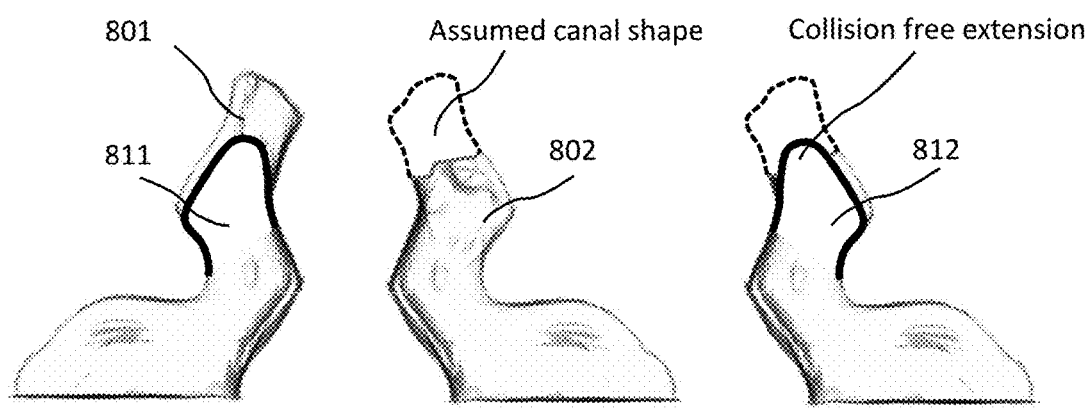
FIG. 17 shows binaural modeling where the same template is used for the right and left ear.

Situation [0065b] is illustrated in FIG. 17: the left impression 801 with a long canal offers a reasonable assumption regarding the shape of the missing part on the right impression 802. Therefore, the same AP template is used to model the left insert 811 and right insert 812.

Figure 18:
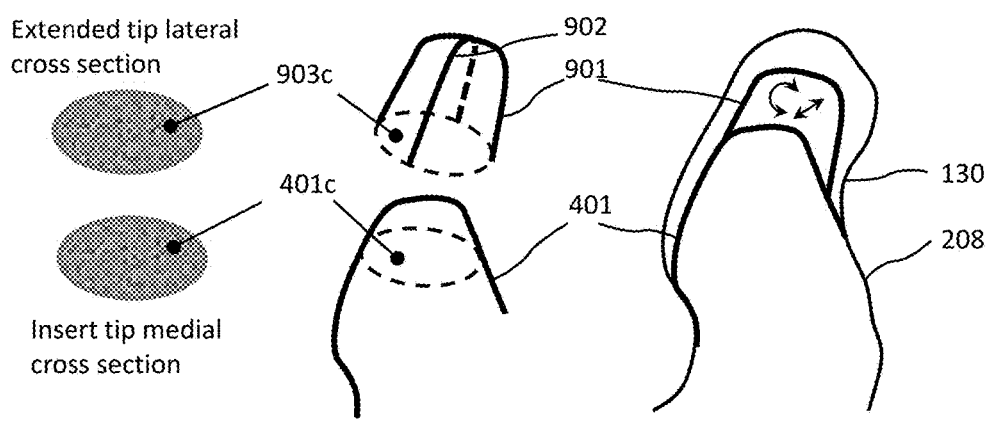
FIG. 18 shows templates APE 901 and SIE 902 that extend the insert tip past the second bend.

For ear inserts that require a very long canal, the insert tip is extended past the canal second bend 130. As illustrated in FIG. 18, extending the length of a custom insert requires an additional 3D frame that comprises a set of templates APE 901 and SIE 902.

Since the medial cross sections 401c of the insert tip 401 and the lateral cross section 903c of the extended tip are regular ovals, it requires only one APE and one SIE template to create an adjustable generic extended tip frame. Stretching and rotation of the extended tip frame creates a seamless transition between the insert tip and the extended tip.

The virtual 3D model of the custom ear insert is evaluated by the software operator. If required, the operator adjusts the insert shape.

If the style of the custom insert calls for inclusion of the concha 130 and/or helix 140 areas, the shaping of those parts is done with computer-aided modeling.

Methods of template design presented here are examples only. It is up to the software developer and the software user to determine what template design best addresses their custom-product modeling needs.

Anatomical Directions and Terms
1. Ear canal is a tube running from the outer ear to the middle ear.
2. Aperture is the entrance to the ear canal.
3. Concha is the hollow region in front of the ear canal.
4. Helix is the prominent rim of the external ear.
5. Binaural means having or relating to two ears.
6. Anterior refers to a structure being more in front than another structure in the body.
7. Posterior refers to a structure being more in back than another structure in the body.
8. Superior refers to a structure being closer to the head or higher than another structure in the body.
9. Inferior refers to a structure being closer to the feet or lower than another structure in the body.
10. Median plane is the mid-line of the body, and divides the body into left and right.
11. Medial refers to a structure being closer to the median plane than another structure in the body.
12. Lateral refers to a structure being further away from the median plane than another structure in the body.
13. Fit rate indicates the benefit of a given custom product.

List of Reference Numerals
10 Ear impression
100 Ear canal
110 First canal bend
120 Canal aperture
130 Second canal bend
150 Concha
160 Helix
170 Bulge on ear canal
200, 201, 202, 203, 204 Ear impression
205, 206, 207, 208 Ear impression
205a, 205b, 205c Impression cross section
301, 302, 303, 304, 305 Ear insert
401, 402, 403 AP template
405, 406 SI template
410, 411, 412, 413 Ear insert
401c, 410a, 410b, 410c Insert cross section
4011, 4012, 4013, 4014 Template section
501, 502, 503, 504, 505 Ear impression
600, 601, 602, 603 Canal entrance
700 Comfort zone
801, 802 Ear impression
811, 812 Left and right ear insert
901 APE template
902 SIE template
903c Extended tip cross section
951 Acoustic seal area
952 Retention area
953 Insertion & comfort area
954 Sound direction area Referenced Cited

U.S. PATENTS

| Pat. No. | Issue Date | Name of Patentee |
|---|---|---|
| U.S. Pat. No. 7,084,870 | Aug. 1, 2006 | Tong FANG et al. |
| U.S. Pat. No. 7,286,679 | Dec. 19, 2002 | Tong FANG et al. |
| U.S. Pat. No. 7,447,556 | Feb. 3, 2006 | MCBAGONLURI et al. |
| U.S. Pat. No. 7,605,812 | Dec. 19, 2006 | MCBAGONLURI et al. |
| U.S. Pat. No. 8,032,337 | Mar. 2, 2001 | Nikolaj DEICHMANN et al. |
| U.S. Pat. No. 8,285,408 | Jun. 15, 2009 | Ean H. SCHILLER et al. |

FOREIGN PATENT DOCUMENTS

| Document Number | Issue Date | Name of Patentee |
|---|---|---|
| CA2408449 | Feb. 24, 2009 | Jan TOPHOLM et al. |
| WO2006117407 | Jun. 13, 2006 | Hans HESSEL et al. |

NON-PATENT LITERATURE DOCUMENTS

CORTEZ, R. et al. Changing with the times: Applying digital technology to hearing aid shell manufacturing. Hearing Review 2004; 11(3): 30-38.
DARKES, P. et al. Shaping the future of shell technology with digital mechanics. Hearing Review 2002; 9(4): 56-57, 76.

The invention claimed is:
1. A method of virtually shaping custom ear inserts derived from digital ear impressions, comprising the steps of:
   a) opening, with one or more computing devices, a file with a digital impression of an ear obtained by a volumetric imaging technique;
   b) taking from a computer database, executable by one or more processors, an AP template having a predetermined AP contour line, where the AP contour line features functional fitting areas comprising acoustic seal, retention, insertion and comfort areas;
   c) placing, executable by one or more processors, the AP template in a canal area of the digital impression, in an anterior-posterior direction, with a tip of the AP template inserted to a default canal depth required for a given custom ear insert;
   d) adjusting, executable by one or more processors, motion, rotation, lengthwise and crosswise template dimensions of the AP contour line such that the acoustic seal area and retention area of the AP template are matched with a shape of a canal aperture and a bulge lateral area of the digital impression, and such that the template comfort area has a collision free fit in the digital impression;
   e) measuring, executable by one or more processors, a target fit accuracy; if the selected AP template does not meet the target fit accuracy, or is not collision free, another AP template is taken from the computer database and fitted in the canal area of the digital impression as set forth in steps b to d;
   f) repeating steps b to e until an AP template that meets the target fit accuracy and achieves a collision free fit is selected;
   g) taking from the computer database, executable by one or more processors, an SI template with a predeter- mined SI contour line, where the SI contour line features functional fitting areas comprising an insertion area and a comfort area;

h) placing, executable by one or more processors, the SI template in the canal area of the digital impression, in a superior-inferior direction, with a tip of the SI template inserted to the same canal depth as the AP template;

i) adjusting, executable by one or more processors, angle, lengthwise and crosswise dimensions of the SI template to achieve a collision free fit in the digital impression;

j) measuring, executable by one or more processors, to see if the selected template fits collision free, if it is not collision free, another SI template is taken from the computer database and fitted in the digital impression as set in steps g to i;

k) repeating steps g to i until an SI template with a collision free fit is selected;

l) integrating, executable by one or more processors, the selected AP template and the selected SI template with the digital impression and smoothing rigid edges to define round contours;

m) assembling, executable by one or more processors, the selected AP template and the selected SI into a 3D virtual frame for the custom ear insert;

wherein the 3d virtual frame defines the acoustic seal, retention, insertion and comfort areas of the AP and SI templates.

2. The method of virtual shaping custom ear inserts of claim 1, further comprising:

a) surfacing, executable by one or more processors, the acoustic seal area and the retention area on the 3D virtual frame with irregular oval rings that closely conform to a shape of digital impression;

b) surfacing, executable by one or more processors, a 3D frame transition area between the retention area and comfort area of the 3D virtual frame with oval rings that gradually change from irregular ovals to regular ovals;

c) surfacing, executable by one or more processors, the insertion and comfort areas of the 3D virtual frame with regular oval rings that make no contact with the digital impression; wherein the height of the oval rings is 0.1 mm to 0.3 mm and depends on an insert modeling resolution required;

d) positioning, executable by one or more processors, the oval rings parallel to a lateral opening of the 3D virtual frame, thus creating a 3D virtual mold of the custom insert;

wherein steps a) to d) are automatically executed by one or more computing devices.

3. The method of virtual shaping custom ear inserts of claim 2, further comprising:

a) adding, executable by one or more processors, a line with a predetermined thickness and length to the contour line of the AP template and the SI template to create a comfort zone between the templates and the digital impression;

b) removing, executable by one or more processors, each comfort zone from the 3D virtual frame before the surfacing of the 3D virtual frame;

wherein steps a) to b) are automatically executed by one or more computing devices.

4. The method of virtual shaping custom ear inserts of claim 1, further comprising extending, executable by one or more processors, the canal length of the custom ear insert.

* * * * *